(12) United States Patent
Dabrowski

(10) Patent No.: US 9,074,910 B2
(45) Date of Patent: Jul. 7, 2015

(54) DATA-RECORDING DEVICE FOR A MEASUREMENT DEVICE AND MEASUREMENT SYSTEM

(75) Inventor: Markus Dabrowski, Duisburg (DE)

(73) Assignee: Krohne Messtechnik GMBH & Co. KG (DE)

( * ) Notice: Subject to any disclaimer, the term of this patent is extended or adjusted under 35 U.S.C. 154(b) by 1233 days.

(21) Appl. No.: 12/335,874

(22) Filed: Dec. 16, 2008

(65) Prior Publication Data

US 2010/0153070 A1 Jun. 17, 2010

(51) Int. Cl.
*G06F 17/40* (2006.01)
*G01D 9/00* (2006.01)

(52) U.S. Cl.
CPC ..................... *G01D 9/005* (2013.01)

(58) Field of Classification Search
CPC ...................................................... G01D 9/005
USPC .................................................... 702/80, 187
See application file for complete search history.

(56) References Cited

U.S. PATENT DOCUMENTS

| 5,497,464 | A | * | 3/1996 | Yeh .............................. 710/303 |
| 2004/0029409 | A1 | * | 2/2004 | Moon et al. ..................... 439/65 |
| 2007/0088904 | A1 | * | 4/2007 | Sinclair ......................... 711/103 |
| 2007/0260784 | A1 | * | 11/2007 | Takamatsu et al. ............. 710/62 |
| 2008/0123259 | A1 | * | 5/2008 | Moser ............................ 361/679 |
| 2009/0082918 | A1 | * | 3/2009 | Hendrix, Jr. .................... 701/33 |

FOREIGN PATENT DOCUMENTS

GB 2283588 A * 5/1995

* cited by examiner

*Primary Examiner* — Patrick Assouad
*Assistant Examiner* — Haidong Zhang
(74) *Attorney, Agent, or Firm* — Cesari and McKenna, LLP

(57) ABSTRACT

A data-recording device for a measurement device (2) that contains measurement device electronics (3) having an internal data bus and a data interface (4), wherein the data-recording device includes at least one storage element (5), at least one processing unit (6) linked with the storage element (5) and a data interface (7) and wherein the device can be linked with the measuring device via its data interface and via the corresponding data interface of the measurement device and data can be exchanged between the measurement device and the data-recording device. The data-recording device is able to read-only access the internal data bus of the measurement device (2) without functional interference via its data interface (7)—bus observation, thus avoiding certain disadvantages of similar prior data-recording devices.

14 Claims, 3 Drawing Sheets

DATA-RECORDING DEVICE FOR A MEASUREMENT DEVICE AND MEASUREMENT SYSTEM

BACKGROUND OF THE INVENTION

1. Field of the Invention

The invention relates to a data-recording device for a measurement device, wherein the measurement device contains measurement device electronics having an internal data bus and a data interface, wherein the device includes at least one storage element, at least one processing unit linked with the storage element and a data interface and wherein the device can be linked with the measuring device via its data interface and via the corresponding data interface of the measurement device and data can be exchanged between the measurement device and the data-recording device. The invention also relates further to a measurement system with a measuring device and a data-recording device, wherein the measurement device contains measurement device electronics having an internal data bus and a data interface for access to the data bus as well as a housing, wherein the housing encloses the measurement device electronics, wherein the data-recording device includes at least one storage element, at least one processing unit linked with the storage unit and a data interface and wherein the data-recording device can be linked with the measurement device via its data interface and via the corresponding data interface of the measuring device and data can be exchanged between the measurement device and the data-recording device.

2. The Prior Art

Data-recording device for a measurement device and measurement system of the type in question have been known for a some time and are normally used in industrial practice for processing data provided by the measurement device. In the case of a temperature measurement device, the data is the measured temperature, in a mass flowmeter, the measured mass flow, etc. These data provided by the measurement device and gathered by the data-recording device are transmitted via the corresponding data interfaces of the measurement device electronics and the data-recording device, wherein these data interfaces are normally completely decoupled from the data exchange between the components of the measurement device electronics via the internal data bus. This is achieved, inter alia, in that the data interface is designed according to a—standardized—hardware and/or software specification (e.g. USB, RS-232 etc.).

So that data for data-recording can be transferred to the device via the afore-mentioned, normally used data interface, the measurement device has to provide and carry out a respective service—normally implemented with a software routine so that the data of interest can be disbursed via the data interface. Against this background, it is understandable that solely the read-only access of the data-recording device on the measurement device—i.e. purely observation of the measurement device—influences the measurement device in its internal course, since the measurement device has to be arranged for instruments for provision of the data supplied via the interface. The resulting read-only access to the measurement device via the above-described data interface changes the functionality of the measurement device compared to an unobserved state since the services provided for supplying data e.g. have to be accessed dependent on the sampling rate with varying frequency, which naturally also influences the course and the coordination of other sequences carried out by the measurement device.

Experience shows that such data-recording devices are particularly disadvantageous when they are drawn upon for diagnostic inspection. In expansively networked process control systems, in which measurement devices are multiply linked to one another, the described observation of just one measurement device also effects the temporal interaction of multiply-linked components, so that the data collected in the observed state of the measurement device cannot describe the state of the system in an unobserved state.

Moreover, the diagnosis of a measurement device is only possible with limitations via the described data interfaces, since an evaluation of the internal processes is practically impossible in the measurement device electronics.

SUMMARY OF THE INVENTION

The object of the present invention is to avoid—at least partially—the listed disadvantages in known data-recording devices for a measurement device and for known measurement systems.

The object is met according to the invention and essentially with the data-recording device in question in that the device is able to read-only access the internal data bus of the measurement device functionally without interference via its data interface, i.e. can carry out a bus observation. If it is said that the read-only access of the data-recording device occurs "functionally without interference", then it is meant that the observation of the measurement device—reading of the data from the measurement device—does not influence the internal operation of the measurement device or, respectively, the measurement device electronics; in particular the measurement device is not influenced in such a manner that the read-only access of the measurement device does initiate or even require the implementation of corresponding services for data retrieval in the measurement device electronics. Access to the internal data bus of the measurement device causes the internal "raw data" of the measurement device or, respectively, the measurement device electronics to become accessible, which means that the data-recording device according to the invention is not only suitable for the known acquisition of reference data, but can also be employed for diagnostic inspection and maintenance.

In an advantageous embodiment of the invention, the data-recording device is designed in total, so that the data uploaded via the data interface from the data bus—i.e. from the internal data bus—of the measurement device can be saved on the storage element, whereby data storage takes place. The device can then, for example, be used to carry out long-term data-recording for the purpose of process control. However, data-recording can also be used for diagnostic purposes, in order to identify possible malfunctions of the measurement device, wherein diagnostic inspection takes place, or respectively can take place at the lowest level of the measurement device architecture in terms of hardware and/or software since the data uploaded by the data-recording device stems directly from the internal data bus of the measurement device.

According to a further advantageous embodiment of the invention, it is provided by the data-recording device that the data read via the data interface from the data bus of the measurement device can be analyzed before saving on the storage device, so that data analysis takes place. It is understood, for example, that the device interprets data recorded by the internal data bus of the measurement device—for example, distinguishes between measurement values and control commands—and only selectively saves certain data. Data analysis is also understood in that the data flow recorded by the internal data bus of the measurement device is examined for certain data patterns and only these occurrences are recorded.

Alternatively or additionally, the device can also be designed so that the data uploaded from the data bus of the measurement device are transformed by the processing unit before saving on the storage device, whereby data transformation in implemented. Data transformation can be understood in that the data collected in a first data format is translated into a second data format or, e.g. the reference data imbedded in a protocol are separated.

In a preferred embodiment of the invention, the storage element is arranged on the device so that it can be removed, which has the advantage that the entire device does not have to be separated from the measuring device for further processing of the recorded data, rather it is sufficient to remove the storage element from the data-recording device, wherein the storage element can be read elsewhere by a suitable reading device. Data transfer succeeds easily when the storage element is a standardized data carrier, such as, at the current time, for example a secure digital memory card (SD card). Such flat data carriers can be inserted, slipped or fixed onto a flat circuit board in a suitable mounting in a manner that saves space. In this manner, the device can be formed particularly very flat, which favors a space-saving mounting of the data-recording device on or in the measuring device.

In a particularly advantageous embodiment of the invention, observation of the bus and/or data storage and/or data analysis and/or data transformation can be changeably simulated by programming of the processing unit. This can occur, for example, in that the code implementing the particular functionality is stored on a further storage element of the device.

Preferably, however, the programming occurs by means of at least one control statement saved on the storage unit, which is read and carried out by the processing unit. If it is said that the functionality of the data-recording device is "changeably simulated", then, generally, the specification of an arbitrary functionality is meant, which can be implemented with instruments in terms of hardware of the data-recording device. In particular, however, this relates to the frequency of the value collection, the selection of certain data to be recorded and the specification of the data format that is identified or is to finally be saved on the storage element.

The object described above is met according to a further teaching of the invention with the measurement system in question having a measurement device and a data-recording device in that the data-recording device is designed so that it is provided according to the first teaching of the invention described above. The measurement device of the measurement system is distinguished, in particular, in that its measurement device electronics have a data interface, which allows for access to the internal data bus of the measurement device electronics.

According to an advantageous embodiment of the measurement system, the measurement device and the data-recording device can be detachably connected to one another. This has the advantage that the measurement device can be equipped temporarily with the possibility of local data acquisition. In many applications, in particular in the use of a measurement device in an extensive overall process with a higher-ranking process control, a permanent, local possibility for data acquisition connected with the measurement device by means of a data-recording device is not at all necessary, since the measured data of the measuring device are generally effected via another data interface that does not access the local data bus. The costs for producing a measurement device applicable in the scope of the measurement system according to the invention barely differ from the costs of a measurement device known from the prior art since there is no data interface accessing the internal data bus of the measurement device electronics.

According to an advantageous embodiment of the invention, the measurement device electronics and the data-recording device are arranged in the housing of the measurement device in the assembly state, so that the data-recording device is also protected by the housing of the measurement device or, respectively, the data-recording device is also sealed away from the outside world, so that the availability for use of the measurement device produced by the housing also extends to the data-recording device. This is e.g. important in environments with explosions risks, when the housing, for example, represents a pressure-resistant casing in terms of explosion protection (Ex-d).

According to another advantageous embodiment of the invention, the housing of the measurement device has a closeable access opening, via which the data-recording device can be connected with the measurement device electronics, wherein the access opening is accessible, in particular can be activated in the assembly state of the measurement system or, respectively, measurement device. This means that the data-recording device is not only connected to the measuring device electronics when the access opening is open, but also that the data-recording device can be connected in standby to the measurement device electronics when the access opening is closed. Here, too, in turn, it is of particular advantage that the housing also has a protective function for the data-recording device.

In detail, there is a plurality of possibilities for designing and further developing the data-recording device according to the invention and the measurement system according to the invention. On the one hand, the dependent patent claims should be referred to, and, on the other hand, the following description of embodiments in connection with the drawings.

DESCRIPTION OF A PREFERRED EMBODIMENT

Figure 1A:
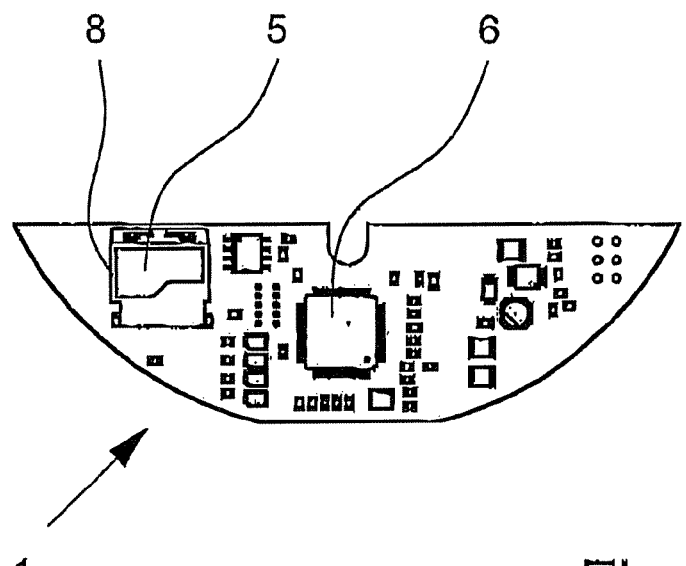
FIGS. 1a and 1b are an embodiment of a data-recording device according to the invention for a measurement device, viewed from above.
Figure 1B:
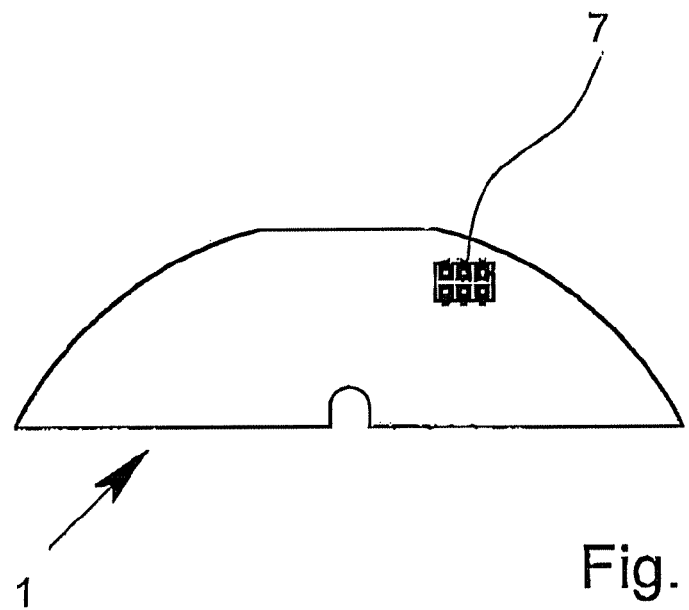
Figure 2:
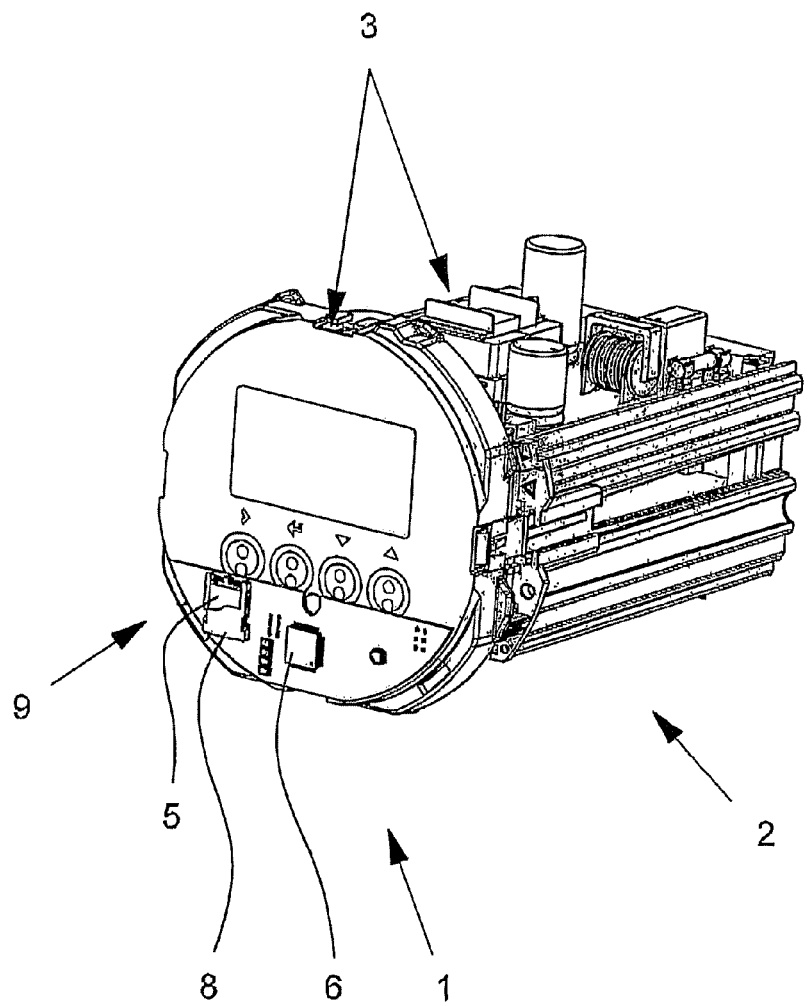
FIG. 2 is an embodiment of a measurement system according to the invention having a measurement device and a data-recording device in the assembled state.
Figure 3:
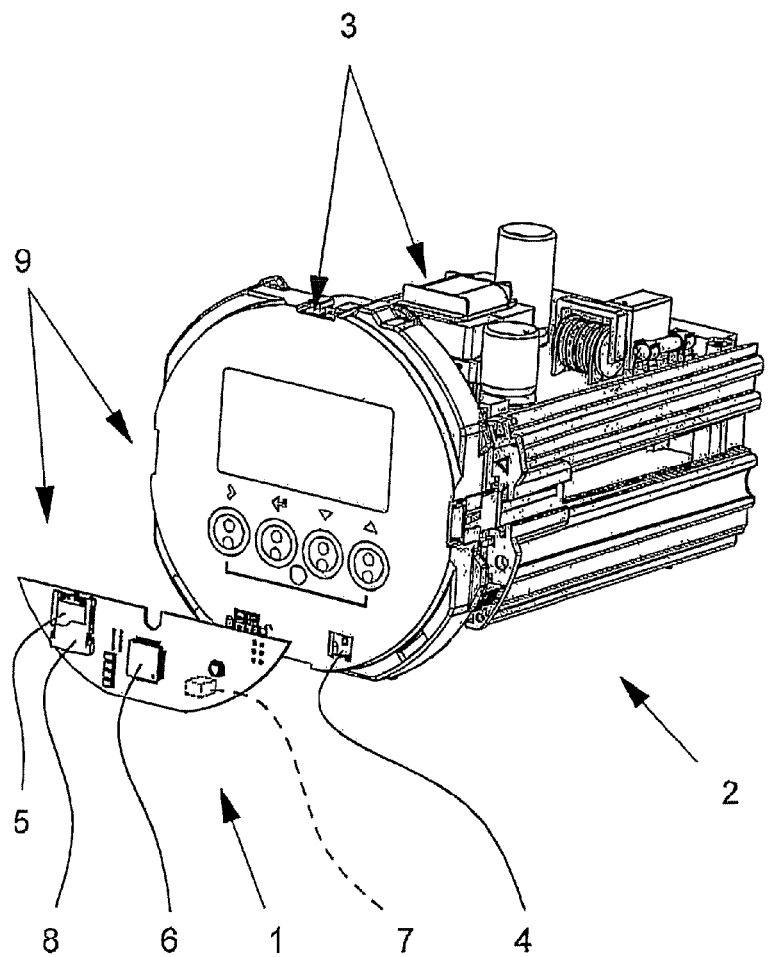
FIG. 3 is the embodiment according to FIG. 2 of a measurement system according to the invention having a data-recording device disassembled from the measurement device.

A data-recording device 1 is shown in FIGS. 1a and 1b for a measurement device, wherein the measurement device 2 is only shown in FIGS. 2 and 3. The measurement device 2 shown in FIGS. 2 and 3 is a part of a Coriolis mass flowmeter, wherein further parts belong to the complete measurement device 2, such as, e.g., a Coriolis measuring tube and a housing—also not shown.

In any case, the measurement device electronics 3 can be identified having an internal data bus—not shown—and having a data interface 4. As can be seen in all three figures, the data-recording device 1 contains a storage element 5, a processing unit 6 connected to the storage element 5 and a data interface 7; the connection between the storage element 5 of the processing unit 6 and the data interface 7 is not shown in the figures.

In particular, it can be seen in FIG. 3, that the data-recording device 1 can be connected to the measurement device 2 via its data interface 7 and via the corresponding data interface 4 of the measurement device 2 and data can be exchanged between the measurement device 2 and the data-recording device 1. The device 1 is distinguished in that it can read-only access the internal data bus of the measurement device 2 via its data interface 7 without functionally influencing it and thus implements a bus observation of the measurement device 2.

By means of the functionally non-influencing access of the data-recording device 1 to the internal data bus of the measurement device 2, the internal processes of the measurement device 2 are not influenced by observation, which is particularly advantageous for diagnostic inspection. By means of the direct access to the internal data bus of the measurement device 2, the measurement device 2 does not need to be arranged for instruments for the measurement conducted by the data-recording device 1. It is also not necessary that the data-recording device 1 assigns any sort of identification via the data interface 7 to the measurement device 2, since the data-recording device 1 taps the data without influencing the internal data bus of the measurement device 2 or, respectively, the measurement device electronics 3.

The data-recording device 1 shown in FIGS. 1 to 3 is designed so that the data read by the data bus of the measurement device 2 via the data interface 7 can be stored, whereby data storage is implemented. At the same time, not only specifically chosen and interpreted data can be saved on the storage element 5, but also raw data transported via the internal data bus of the measurement device 2 or, respectively the measurement device electronics 3.

Nevertheless, the data-recording device shown in the figures is designed so that the data read by the data bus of the measurement device 2 via the data interface 7 can be analyzed and/or transformed before being saved on the storage element 5 of the processing unit, i.e. the device 1 conducts data analysis and/or a data transformation. In the context of data analysis, the shown data-recording device 1 filters, for example, only the reference data—in the present case, i.e. the value of the mass flow—out of a plurality of data transported via the internal data bus of the measuring device electronics 3. In the context of data transformation, this raw data is transformed into another format before it is stored.

Furthermore, the storage element 5 can be removably arranged on the data-recording device 1. To be more exact, the storage element 5 in the embodiments according to FIGS. 1 to 3 is a microSD card (micro secure digital memory card) that lies flat on the planar circuit board. The storage element 5 is inserted on a mount 8 provided on the circuit board and then clamped by means of a retaining flap. The storage element 5 can thus be removed from the data-recording device 1 and, for example, be transmitted and uploaded in another device for interpreting the recorded data.

The data-recording device 1 shown in FIGS. 1 to 3 is particularly advantageous in that by means of programming the processing unit 6, bus observation and data storage and data analysis and data transformation can be alterably preselected, wherein programming occurs by means of control statements saved on the storage element 5. The data-recording device 1 first controls if data for configuring the device 1 exist on the storage device 5 or, respectively, if corresponding control statements are saved on the storage element 5 and implements these control statements by means of the processing unit 6 of the measurement device electronics 3.

The measurement system 9 shown in FIGS. 2 and 3 includes a measurement device 2 and a data-recording device 1, wherein the measurement device 2 includes measurement device electronics 3 having an internal data bus, which is presently not shown, and a data interface 4 for accessing the data bus as well as a housing. The housing, not shown here, encloses the measurement device electronics 3.

The device 1 includes, among other things, a storage element 5, a processing unit 6 connected with the storage element 5 and a data interface 7, wherein the device 1 can be connected with the measurement device 2 via its data interface 7 and via the corresponding data interface 4 of the measurement device 2 and data can be exchanged between the measurement device 2 and the device 1.

In FIGS. 2 and 3, the data-recording device is designed as has been previously described on the basis of the data-recording device 1 according to FIG. 1. Above all, the data-recording device 1 can thus read-only access in the internal data bus of the measurement device 2 via its data interface without functionally influencing it. As can be seen in FIG. 3, the data-recording device 1 and the measurement device 3 can be detachably connected to one another, which leads to the advantage that the measurement device 2 can be only temporarily equipped with the data-recording device 1.

Because of the flat construction of the data-recording device 1, it is possible to arrange the measurement device electronics 3 and the data-recording device 1 in the assembled state of the housing of the measurement device 2, which is not shown.

In the illustrated embodiment, the measurement system 9 is designed so that the data-recording device 1 is provided with the required electrical power from the measurement device 2. The power supply occurs in this case via the corresponding data interfaces 4, 7 of the data-recording device 1 and the measurement device 2. It is thus achieved that a minimal amount of ports—in particular also of mechanical/electric ports—need to be provided.

What is claimed is:

1. A data-recording device for a measurement device (2),
   wherein the measurement device (2) contains measurement device electronics (3) having an internal data bus and a first data interface connector (4),
   wherein the data-recording device includes at least one storage element (5), at least one processing unit (6) linked with the storage element (5) and a second data connector interface (7),
   wherein the data-recording device can be linked with the measuring device by mechanically connecting together the first and second interface connectors so that data can be exchanged between the measurement device (2) and the data-recording device,
   wherein the data-recording device can read-only access the internal data bus of the measurement device (2) without functional influence via said second data interface connector (7)—bus observation—by tapping the internal data bus of the measurement device (2) in order to observe the data on said bus without functionally influencing the internal operation of the measurement device (2) or the measurement device electronics (3) via said second data interface connector (7), and
   wherein the read-only access of the internal bus of the measurement device does not initiate services, by the data-recording device, for data retrieval in the measurement device electronics,
   wherein the data-recording device is supplied with required electrical power from the measurement device.

2. The device according to claim 1, characterized in that the data read via the second data interface connector (7) by the data bus of the measurement device (2) can be saved on the storage element (5)—data storage.

3. The device according to claim 2, characterized in that the data read via the second data interface connector (7) by the data bus of the measurement device (2) can be analyzed—data analysis—and/or transformed—data transformation—by the processing unit (6) before being saved on the storage element (5).

4. The device according to any one of claims 1 to 3, characterized in that the storage element (5) is removably arranged on the data-recording device.

5. The device according to any one of claims 1 to 3, characterized in that by programming the processing unit (6), bus observation and/or data analysis and/or data transformation can be changeably preset, in particular in view of frequency, selection and data format, and wherein the programming occurs by means of at least one control statement saved on the storage element (5).

6. A measurement system having a measurement device (2) and a data-recording device (1),
- wherein the measurement device (2) contains measurement device electronics (3) having an internal data bus and a data interface (4) for access to the data bus as well as a housing,
- wherein the housing encloses the measurement device electronics (3), and supports the data interface connector (4),
- wherein the device (1) includes at least one storage element (5), at least one processing unit (6) linked with the storage element (5) and a data interface connector (7),
- wherein the data-recording device (1) can be linked with the measurement device (2) via its data interface connector (7) and via the corresponding data interface connector (4) of the measurement device (2) by mechanically coupling together said data interface connectors (4, 7) so that data can be exchanged between the measurement device (2) and the data-recording device (1), and
- wherein the data-recording device can read-only access the internal data bus of the measurement device (2) without functional influence via said data interface connector (7)—bus observation—by tapping the internal data bus of the measurement device (2) in order to passively observe the data on the internal data bus without functionally influencing the internal operation of the measurement device (2) or the measurement device electronics (3) via said data interface connector (7),
- wherein the data-recording device is supplied with required electrical power from the measurement device.

7. The measurement system according to claim 6, characterized in that the data read via the second data interface connector (7) by the data bus of the measurement device (2) can be saved on the storage element (5)—data storage.

8. The measurement system according to claim 6 or 7, characterized in that the data read via the second data interface connector (7) by the data bus of the measurement device (2) can be analyzed—data analysis—and/or transformed—data transformation—by the processing unit (6) before being saved on the storage element (5).

9. The measurement system according to claim 6 or 7, characterized in that the housing has a closable access opening, via which the data-recording device (1) can be connected to the measurement device electronics (3), wherein the access opening is accessible, in particular can be activated in the assembled state of a measurement system or, respectively, measurement device, and wherein the housing represents a pressure-resistant casing in terms of explosion protection.

10. The measurement system according to claim 6 or 7, characterized in that the data-recording device (1) is supplied with required electrical power from the measurement device (2), via the corresponding data interface connectors (4, 7) of the data-recording device (1) and the measurement device (2).

11. The measurement system according to claim 6 or 7, characterized in that the measurement device (2) and the data-recording device (1) are removably attached.

12. The measurement system according to claim 6 or 7, characterized in that the measurement device electronics (3) and the data-recording device (1) are arranged in the housing of the measurement device (2) in the assembled state.

13. A data-recording device for a measurement device (2),
- wherein the measurement device (2) contains measurement device electronics (3) having an internal data bus and a first data interface connector (4),
- wherein the data-recording device includes at least one storage element (5), at least one processing unit (6) linked with the storage element (5) and a second data connector interface (7),
- wherein the data-recording device can be linked with the measuring device by mechanically connecting together the first and second interface connectors so that data can be exchanged between the measurement device (2) and the data-recording device,
- wherein the data-recording device can read-only access the internal data bus of the measurement device (2) without functional influence via said second data interface connector (7)—bus observation—by tapping the internal data bus of the measurement device (2) in order to observe the data on said bus without functionally influencing the internal operation of the measurement device (2) or the measurement device electronics (3) via said second data interface connector (7), and
- wherein the data-recording device is supplied with required electrical power from the measurement device.

14. The device according to claim 13, characterized in that said data observed by the data-recording device via said second data interface connector (7) is raw measurement data transferred over the internal data bus of the measurement device (2).

* * * * *